US009600916B2

(12) United States Patent
Saito et al.

(10) Patent No.: US 9,600,916 B2
(45) Date of Patent: Mar. 21, 2017

(54) IMAGE PROCESSING APPARATUS FOR CREATING COMPOSITE IMAGES, IMAGE PROCESSING METHOD, AND NON-TRANSITORY COMPUTER READABLE RECORDING MEDIUM

(71) Applicant: FUJIFILM Corporation, Tokyo (JP)

(72) Inventors: Masaki Saito, Tokyo (JP); Daisuke Yamada, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 72 days.

(21) Appl. No.: 14/535,794

(22) Filed: Nov. 7, 2014

(65) Prior Publication Data
US 2015/0131925 A1 May 14, 2015

(30) Foreign Application Priority Data
Nov. 11, 2013 (JP) .................................. 2013-233104

(51) Int. Cl.
G06K 9/36 (2006.01)
G06T 11/60 (2006.01)

(52) U.S. Cl.
CPC .................................... *G06T 11/60* (2013.01)

(58) Field of Classification Search
CPC ......... G06T 11/60; G06T 3/4038; G06T 5/50; H04N 1/3876; H04N 5/23238
See application file for complete search history.

(56) References Cited

U.S. PATENT DOCUMENTS 5,550,647 A * 8/1996 Koike ................ H04N 1/40062
358/2.1
7,403,710 B2 * 7/2008 Itokawa .................... G06T 5/50
348/208.99

(Continued)

FOREIGN PATENT DOCUMENTS

JP      2004-246868      9/2004
JP      2006-120076      5/2006

(Continued)

OTHER PUBLICATIONS

Japanese Office Action dated Nov. 4, 2015 in corresponding Japanese Patent Application No. 2013-233104 with English translation of Japanese Office Action.

*Primary Examiner* — Amir Alavi
(74) *Attorney, Agent, or Firm* — Young & Thompson (57) ABSTRACT

The image processing apparatus includes a candidate image acquisition unit acquiring candidate images for use in creating a composite image, a processed image determination unit determining about whether candidate images are unprocessed original images or processed images, an image count determination unit determining about whether or not the number of original images included in the candidate images is equal to or greater than a threshold value set in advance based on the determination result by the processed image determination unit, and a use image determination unit which determines when the number of original images is equal to or greater than the threshold value, only the original images are used in creating the composite image and determines when the number of original images is less than the threshold value, the original images and the processed images are used in creating the composite image or stops the creation of the composite image.

31 Claims, 5 Drawing Sheets

(56) References Cited

U.S. PATENT DOCUMENTS

| | | | |
|---|---|---|---|
| 7,515,294 B2* | 4/2009 | Yamazoe | G06F 17/3028 358/1.18 |
| 7,656,399 B2* | 2/2010 | Ono | G06T 11/60 345/204 |
| 8,311,304 B2* | 11/2012 | Huo | G06K 9/4609 382/128 |
| 8,417,068 B2 | 4/2013 | Yamazoe | |
| 9,235,916 B2* | 1/2016 | Tanaka | H04N 1/409 |
| 2004/0161224 A1 | 8/2004 | Yamazoe et al. | |
| 2015/0131925 A1* | 5/2015 | Saito | G06T 11/60 382/284 |

FOREIGN PATENT DOCUMENTS

| | | |
|---|---|---|
| JP | 2010-67186 | 3/2010 |
| JP | 2010-176459 | 8/2010 |

\* cited by examiner

IMAGE PROCESSING APPARATUS FOR CREATING COMPOSITE IMAGES, IMAGE PROCESSING METHOD, AND NON-TRANSITORY COMPUTER READABLE RECORDING MEDIUM

CROSS-REFERENCE TO RELATED APPLICATIONS

The present application claims priority under 35 U.S.C. §119 to Japanese Patent Application No. 2013-233104, filed on Nov. 11, 2013, all of which are hereby expressly incorporated by reference into the present application.

BACKGROUND OF THE INVENTION

1. Field of the Invention

The present invention relates to an image processing apparatus, an image processing method, a program, and a recording medium which determine images for use in creating a composite image from among a plurality of images.

2. Description of the Related Art

In an image processing apparatus of the related art which creates a composite image, such as a photo book, collage print, or a postcard, for example, it is assumed that a composite image is created using original images (unprocessed original images) imaged by a digital camera. In contrast, in recent years, for example, a composite image is created using images uploaded on a social network system (SNS), or the like.

On the other hand, there are many cases where, in addition to the original images, processed images created by processing the original images are included in the images uploaded on the SNS.

Figure 5:
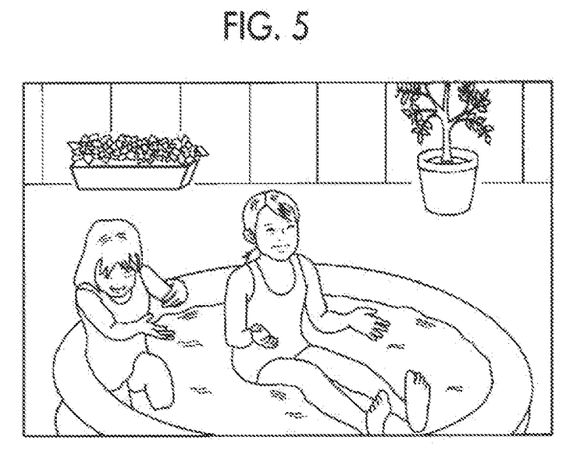
FIG. 5 is a conceptual diagram showing an example of an original image.
Figure 6A:
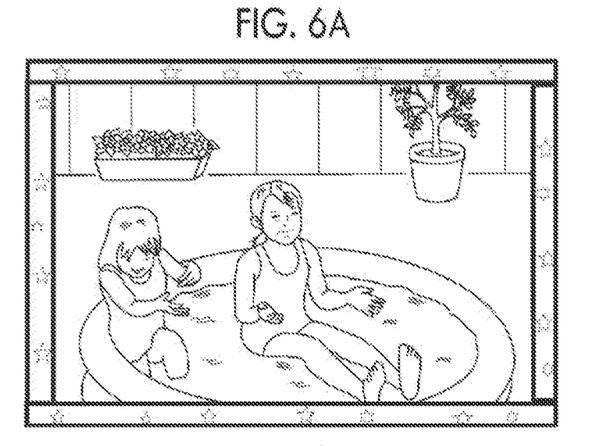
FIGS. 6A, 6B, and 6C are conceptual diagrams showing an example of a user-processed image created by processing the original image shown in FIG. 5.
Figure 6B:
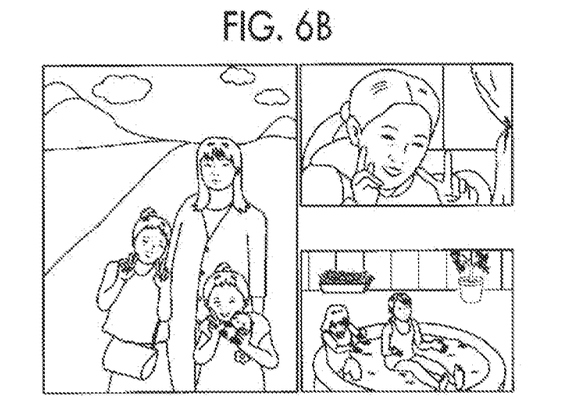
Figure 6C:
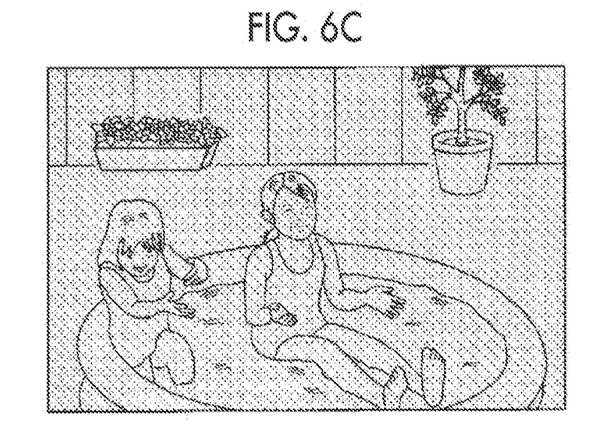

The processed images include processed images user-processed images) created by subjecting various kinds of processing to original images according to user intention, such as a processed image in which, as shown in FIG. 6A, a decoration, such as a frame, is composited to an original image shown in FIG. 5, a processed image in which, as shown in FIG. 6B, a plurality of original images including the original image shown in FIG. 5 are composited, and a processed image in which, as shown in FIG. 6C, the original image shown in FIG. 5 is color-corrected to sepia, monochrome, or the like. The processing by the user includes processing which is performed in a specific imaging mode (sepia mode, monochrome mode, or the like) at the time of imaging by a digital camera.

The processed images include images whose size is reduced on the SNS side or images whose supplementary information (meta information), such as exchangeable image file format (Exit) information, is removed when images are uploaded on the SNS.

The images for use in creating the composite image are not limited to the images uploaded on the SNS, and even in a typical print order, processed images or images with no supplementary information may be used.

As described above, since the processed images are images created by performing various kinds of processing on the original images, for example, when the processed images are used in a photo book, the value of a commodity may be degraded due to mismatching with design of the photo book.

When supplementary information of images is missing, since it is not possible to classify the images based on the supplementary information in the order of imaging date and time, it is not possible to automatically layout an image on a page desired by the user or at a desired position on the page, and the value of the photo book may be damaged.

JP2004-246868A and JP2006-120076A are examples of the related art related to the invention.

JP2004-246868A describes an image extraction method which inputs evaluation for a plurality of images, extracts a predetermined number of images from among a plurality of images based on the input evaluation, and arranges the extracted images on each page of a photo album to create the photo album.

JP2006-10076A describes an image processing method which attaches "a preference degree" of a selector to each image as a selection key extracts and arranges a predetermined number of images based on "the preference degree", and creates a photo album.

SUMMARY OF THE INVENTION

An object of the invention is to solve the problems in the related art, and to provide an image processing apparatus, an image processing method, a program, and a recording medium capable of determining images for use in creating a composite image without using images unsuitable for creating the composite image as much as possible.

In order to attain the above-described object, the invention provides an image processing apparatus including a candidate image acquisition unit which acquires candidate images for use in creating a composite image, a processed image determination unit which determines whether the candidate images are unprocessed original images or processed images created by processing the original images, an image count determination unit which determines whether or not the number of original images included in the candidate images is equal to or greater than a threshold value set in advance based on the determination result by the processed image determination unit, and a use image determination unit which determines only the original images as images for use in creating the composite image when it is determined that the number of original images is equal to or greater than the threshold value and determines the original images and the processed images as images for use in creating the composite image or stops the creation of the composite image when it is determined that the number of original images is less than the threshold value.

It is preferable that the image processing apparatus further includes an image acquisition unit which acquires a plurality of images held by a user, and a candidate image selection unit which selects candidate images from among the plurality of images, and the candidate image acquisition unit acquires the candidate images selected by the candidate image selection unit.

It is preferable that the image processing apparatus further includes a display unit which displays the images determined by the use image determination unit.

It is preferable that the image processing apparatus farther includes a composite image creation unit which creates the composite image using the images determined by the use image determination unit.

It is preferable that the image processing apparatus further includes a priority determination unit which determines the priority of the candidate images, and the composite image creation unit creates the composite image using the original images and the processed images in a descending order of priority, It is preferable that the priority determination unit determines the priority of a processed image with supplementary information to be higher than the priority of a processed image with no supplementary information.

It is preferable that the image processing apparatus further includes a face authentication unit which performs face authentication of a character included in each of the candidate images to specify the character, and the priority determination unit determines the priority of a processed image including the same character included in a plurality of original images to be higher than the priority of a processed image not including the same character included in the plurality of original images based on the specification of the character by the face authentication unit.

It is preferable that the image processing apparatus further includes a face authentication unit which performs face authentication of a character included in each of the candidate images to specify the character, and the priority determination unit determines the priority of an original image including a character included in a processed image processed by the user to be higher than the priority of an original image not including a character included in a processed image processed by the user based on the specification of the character by the face authentication unit.

It is preferable that the priority determination unit determines the priority of an original image including the same character included in a plurality of processed images processed by the user to be higher than the priority of an original image not including the same character included in a plurality of processed images processed by the user.

It is preferable that the image processing apparatus further includes a processing degree calculation unit which calculates the degree of processing of the processed images, and the priority determination unit determines the priority of the processed images to be higher as the degree of processing is lower.

It is preferable that the image processing apparatus further includes a reprocessing unit which performs reprocessing on the processed images to create reprocessed images including only the regions of the original images, and the priority determination unit determines the priority of the reprocessed images to be higher than the priority of the processed images.

It is preferable that the image processing apparatus further includes an original image determination unit which determines whether the processed images processed by the user among the candidate images are original images before the processing, and the priority determination unit determines the priority of an original image included in a processed image processed by the user to be higher than the priority of an original image not included in a processed image processed by the user based on the determination result by the original image determination unit.

It is preferable that the priority determination unit determines the priority of an original image included, in a plurality of processed images to be higher than the priority of an original image not included in the plurality of processed images.

It is preferable that the processed image determination unit confirms the presence or absence of supplementary information of the candidate images and determines that the candidate images with no supplementary information are the processed images.

It is preferable that the processed image determination unit detects an image boundary in the candidate images and determines that candidate images with an image boundary along a peripheral portion are processed images in which a frame is composited to the original images.

It is preferable that the processed image determination unit detects an image boundary in the candidate images and determines that candidate images with at least one of an image boundary from a peripheral portion toward a central portion and two or more faces of the same character are processing images in which a plurality of original images are composited.

It is preferable that the processed image determination unit detects the value of saturation in the candidate images and determines that candidate images in which the value of saturation is biased compared to an un-color-corrected standard image are processed images created by subjecting color correction to the original images.

It is preferable that the composite image creation unit reduces the processed images to a size smaller than the original images and creates the composite image using the reduced images.

It is preferable that the composite image is a photo book, and the composite image creation unit collects and arranges candidate images with no supplementary information on the same page of the photo book.

It is preferable that the composite image is a photo book, and the composite image creation unit arranges one processed image on a page of the photo book on which only one image is arranged.

It is preferable that the image processing apparatus further includes a face region detection unit which detects a face region of a character included in each of the candidate images, the reprocessing unit extracts, as the reprocessed images, images of a region including a face of a character included in processed images, in which a frame is composited to the original images, or processed images, in which a plurality of original images are composited, based on the detection result of the face region by the face region detection unit, and the composite image creation unit creates the composite image using the reprocessed images of a region including a face of a character extracted from the processed images.

It is preferable that the reprocessing unit extracts, as the reprocessed images, images of a region other than a frame from processed images, in which the frame is composited to the original images, and the composite image creation unit creates the composite image using the reprocessed images of a region other than a frame extracted from the processed images.

It is preferable that the reprocessing unit extracts, as the reprocessed images, original images from processed images, in which a plurality of original images are composited, and the composite image creation unit creates the composite image using the reprocessed images of original images extracted from the processed images.

It is preferable that the image processing apparatus further includes a warning generation unit which gives, to the user, a warning indicating that the composite image is created using the processed image when the composite image is created using the processed images.

It is preferable that the warning generation unit gives, to the user, a warning for confirming whether or not to create the composite image using the processed images before the composite image is created using the processed images.

It is preferable that the warning generation unit gives, to the user, a warning indicating that the composite image is created using the processed images after the composite image is created using the processed images.

The invention provides an image processing method including a step in which a candidate image acquisition unit acquires candidate images for use in creating a composite image, a step in which a processed image determination unit determines whether candidate images are unprocessed original images or processed images created by processing the original images, a step in which an image count determination unit determines whether or not the number of original images included in the candidate images is equal to or greater than a threshold value set in advance based on the determination result by the processed image determination unit, and a step in which a use image determination unit determines only the original images as images for use in creating the composite image when it is determined that the number of original images is equal to or greater than the threshold value and determines the original images and the processed images as images for use in creating the composite image or stops the creation of the composite image when it is determined that the number of original images is less than the threshold value.

It is preferable that the image processing method further include a step in which an image acquisition unit acquires a plurality of images held by a user, and a step in which a candidate image selection unit selects the candidate images among the plurality of images, and the candidate image acquisition unit acquires the candidate images selected by the candidate image selection unit.

It is preferable that the image processing method further includes a step in which a display unit displays the images determined by the use image determination unit.

It is preferable that the image processing method further includes a step in which a composite image creation unit creates the composite image using images determined by the use image determination unit.

The invention provides a program which causes a computer to execute the respective steps of the above-described image processing method.

The invention provides a computer readable recording medium storing a program which causes a computer to execute the respective steps of the above-described image processing method.

According to the invention, when the number of original images included in the candidate images is equal to or greater than the threshold value set in advance, only the original images are determined as images for use in creating the composite image, and only when the number of original images is less than the threshold value, both the original images and the processed images are determined as images for use in creating the composite image.

With this, according to the invention, it is possible to determine images for use in creating a composite image without using processed images unsuitable for creating the composite image as much as possible, and to create the composite image using the determined images.

The priority of the candidate images is determined, whereby it is possible to create a composite image using candidate images suitable for creating the composite image in a descending order of priority.

DESCRIPTION OF THE PREFERRED EMBODIMENTS

Hereinafter, an image processing apparatus, an image processing method, a program, and a recording medium of the invention will be described in detail based on a preferred embodiment shown in the accompanying drawings.

Figure 1:
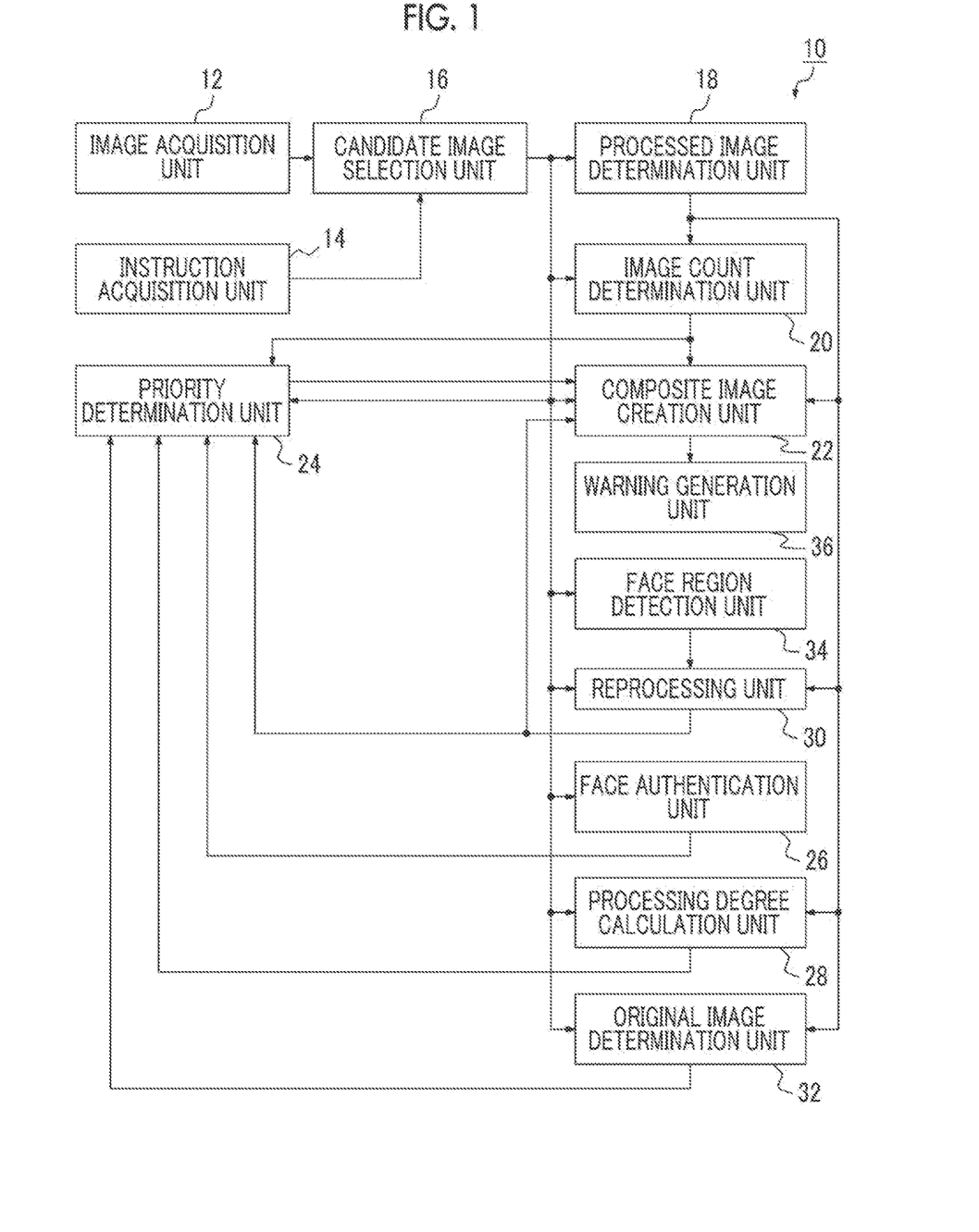
FIG. 1 is a block diagram showing the configuration of an image processing apparatus according to an embodiment of the invention.

FIG. 1 is a block diagram showing the configuration of an image processing apparatus according to an embodiment of the invention. An image processing apparatus 10 shown in FIG. 1 creates a composite image, such as a photo book, collage print, or a postcard, using a plurality of images, and includes an image acquisition unit 12, an instruction acquisition unit 14, a candidate image selection unit 16, a processed image determination unit 18, an image count determination unit 20, a composite image creation unit 22, a priority determination unit 24, a face authentication unit 26, a processing degree calculation unit 28, a reprocessing unit 30, an original image determination unit 32, a face region detection unit 34, and a warning generation unit 36.

The image acquisition unit 12 acquires a plurality of images held by a user, for example, through Internet or from a memory card or the like.

The image processing apparatus 10 may include an image storage unit which stores a plurality of images acquired by the image acquisition unit 12.

The instruction acquisition unit 14 acquires various instructions input by the user.

For example, a user instruction is input through an instruction input unit (not shown) in the image processing apparatus 10 or an instruction input unit, such as a keyboard, a mouse, or a touch panel in a terminal apparatus, such as a personal computer (PC), a tablet, or a mobile terminal held by the user, and is acquired by the instruction acquisition unit 14.

The candidate image selection unit 16 selects candidate images for use in creating a composite image from among a plurality of images acquired by the image acquisition unit 12.

As in this embodiment, when the user inputs an instruction to designate an image group for use in creating a composite image from among a plurality of images held by the user, the candidate image selection unit 16 selects the image group designated by the user from among a plurality of images as candidate images according to the instruction acquired by the instruction acquisition unit 14.

Alternatively, for example, the candidate image selection unit 16 may automatically determine candidate images based on a reference (an image in an album, an image within: given period, or the like) set in advance from an image group uploaded on an SNS by the user.

The image acquisition unit 12 and the candidate image selection unit 16 may not be provided, and for example, instead of the image acquisition unit 12 and the candidate image selection unit 16, a candidate image acquisition unit which acquires candidate images for use in creating a composite image may be provided. The candidate image acquisition unit acquires candidate images input from the outside of the image processing apparatus 10, for example, candidate images designated by the user, candidate images selected by the candidate image selection unit from among a plurality of images acquired by the image acquisition unit 12, or the like.

The processed image determination unit 18 determines whether the candidate images selected by the candidate image selection unit 16 are unprocessed original images or processed images created by processing the original images.

For example, the processed image determination unit 18 of this embodiment determines whether the candidate images are original images or processed images according to (1) to (4).

(1) The presence or absence of supplementary information of the candidate images is confirmed, and it is determined that candidate images with no supplementary information are images with no supplementary information (processed images in which supplementary information of the original images is removed).

(2) An image boundary is detected in the candidate images, and it is determined that candidate images with an image boundary along a peripheral portion is frame composite images (processed images in which a frame is composited to the original images).

(3) An image boundary is detected in the candidate images, and it is determined that candidate images with at least one of an image boundary from a peripheral portion toward a central portion and two or more faces of the same character in one candidate image are plural-image composite images (processed images in which a plurality of original images are composited).

(4) The value of saturation (color tone) of the candidate images is detected, and it is determined that candidate images in which the value of saturation is biased compared to an un-color-corrected standard image are color-corrected images (processed images created by subjecting color correction to the original images) in which various kinds of color correction to sepia, monochrome, or the like are performed.

A method in which the processed image determination unit 8 detects processed images from among the candidate images is not limited to the above-described example, and various methods may be used.

Subsequently, the image count determination unit 20 determines whether or not the number of original images (unprocessed images) included in the candidate images is equal to or greater than a threshold value set in advance based on the determination result by the processed image determination unit 18.

The threshold value is determined according to the specification of a composite image to be created by the image processing apparatus 10. For example, when a photo book is created as a composite image, the threshold value is determined according to the specification of the photo book, that is, the number of pages of the photo book, a page configuration (presence or absence of a cover, a front cover, an intermediate page, a back cover, or the like), a page layout (the number of images included in a page, or the like), or the like. The same applies to a case where collage print, a postcard, or the like is created as a composite image.

The composite image creation unit 22 creates the composite image using the candidate images selected by the candidate image selection unit 16.

When it is determined by the image count determination unit 20 that the number of original images is equal to or greater than the threshold value, the composite image creation unit 22 creates the composite image using only the original images. When it is determined that the number of original images is less than the threshold value, the composite image creation unit 22 can create the composite image using the original images and the processed images or can stop the creation of the composite image.

As described above, when the image processing apparatus 10 includes the candidate image acquisition unit, instead of the image acquisition unit 12 and the candidate image selection unit 16, the composite image creation unit 22 creates the composite image using the candidate images acquired by the candidate image acquisition unit 16.

The composite image creation unit 22 is not required to determine images for use in creating a composite image. For example, a use image determination unit which determines images for use in creating a composite image from among candidate images, and the composite image creation unit may create the composite image using the images determined by the use image determination unit.

In this case, when it is determined that the number of original images is equal to or greater than the threshold value, the use image determination unit determines only the original images as images for use in creating the composite image. When it is determined that the number of original images is less than the threshold value, the use image determination unit can determine the original images and the processed images as images for use in creating the composite image or can stop the creation of the composite image.

When the use image determination unit is provided, it is preferable that a display unit which displays the images determined by the use image determination unit is provided. With this, the user can confirm the images displayed on the display unit for use in creating the composite image in advance.

When displaying the candidate images or the images determined to use, information representing whether the candidate images are original images or processed images and information showing priority at the time of selection may be displayed as well (an image frame is changed or blinked, an icon or a badge is displayed, or the like).

Subsequently, the warning generation unit 36 gives, to the user, a warning indicating that the composite image is created using the processed images when the composite image is created using the processed images by the composite image creation unit 22.

For example, the warning generation unit 36 can give, to the user, a warning for confirming whether or not to create the composite image using the processed images before the composite image is created using the processed images. With this, it is possible to stop the creation of the composite image according to the user's instruction.

Alternatively, the warning generation unit 36 may have, to the user, a warning indicating that the composite image is created using the processed images after the composite image is created using the processed image. With this, the user can recognize that the composite image is created using the processed images.

The warning may be a warning for displaying a text message on the display unit or a warning for reproducing a voice message in a voice reproduction unit, such as a speaker.

The face region detection unit 34 detects a face region of a character included in there candidate images.

As a method in which the face region detection unit 34 detects a face region of a character included in the candidate images, various methods including known methods may be used.

The reprocessing unit 30 performs reprocessing on the processed images to create reprocessed images including only the regions of the original images.

When the processed images are frame composite images, the reprocessing unit 30 extracts, as the reprocessed images, images of a region other than the frame from the frame composite images. With this, the composite image creation unit 22 can create the composite image using the reprocessed images of a region other than the frame extracted from the processed images.

When the processed images are plural-image composite images, the reprocessing unit 30 extracts, as the reprocessed images, the original images from the plural-image composite images. With this, the composite image creation unit 22 can create the composite image using the reprocessed images of the original images extracted from the processed images.

When the processed images are frame composite images or plural-image composite images, the reprocessing unit 30 extracts, as the reprocessed images, images of a region including a face of a character included in the frame composite images or the plural-image composite image based on the detection result of the face region by the face region detection unit 34. With this, the composite image creation unit 22 can create the composite image using the reprocessed images of a region including a face of a character extracted from the processed images.

The face authentication unit 26 performs face authentication of a character included in the candidate images to specify the character.

The face authentication unit 26 of this embodiment detects whether or not there is an original image (unprocessed image) including a character included in a processed image (user-processed image) processed by the user among the candidate images according to the following method (1).

(1) Face recognition of the candidate images and the user-processed image is performed.

The face authentication unit 26 can perform face authentication of a character included in the candidate images to specify the character, can compare a character included in the original images with a character included in the user-processed image, and can determine the presence or absence of an original image including the character included in the user-processed image based on similarity between both characters.

A method in which the face authentication unit 26 detects the presence or absence of an original image including a character included in the user-processed image among the candidate images is not limited to the example of (1) described above, and various methods including known methods may be used.

The processing degree calculation unit 28 calculates the degree of processing of the processed images.

When there is an original image before processing of the processed images among the candidate images, the processing degree calculation unit 28 detects the difference between the processed images and the original image, thereby calculating the degree of processing of the processed images according to the difference.

When the processed images are frame composite images or plural-image composite images, the processing degree calculation unit 28 can calculate the degree of processing of the processed images according to the degree of image composition by detection of an image boundary in the processed images by the processed image determination unit 18, detection about whether or not two or more faces of the same character are included in one processed image, or the like.

When the processed images are color-corrected images, the processing degree calculation unit 28 can calculate the degree of processing of the processed images according to the degree of color correction through comparison of saturation between the processed images and the un-color-corrected standard image by the processed image determination unit 18.

The original image determination unit 32 determines whether or not there is an original image before processing of the user-processed image among the candidate images.

The original image determination unit 32 of this embodiment determines whether or not there is an original image (unprocessed image) before processing of the user-processed image among the candidate images according to the following method. (1) or (2).

(1) Comparison of supplementary information between the candidate images and the user-processed image is performed.

The original image determination unit 32 performs comparison of supplementary information between the candidate images and the user-processed image, thereby determining the presence or absence of an original image before processing of the user-processed image based on similarity of both images.

The original image determination unit 3 performs comparison excluding information, such as a DateTime (date and time) tag or a Software (the name of software used the processing) tag, which is likely to be changed at the time of processing.

(2) Pattern matching between the candidate images and the user-processed image is performed.

The original image determination unit 32 compares the image of the face region detected from the candidate images with the image of the face region detected from the user-processed image based on the face region of the character included in the candidate images detected by the face region detection unit 34, thereby determining the presence or absence of an original image before processing of the user-processed image based on similarity between both images.

When the there region detected by the face region detection unit 34 is expanded or reduced and rotated by processing, it is desirable that the original image determination unit 32 compares both images after the there region is expanded or reduced and rotated according to the face region of the character included in the user-processed image.

Figure 3A:
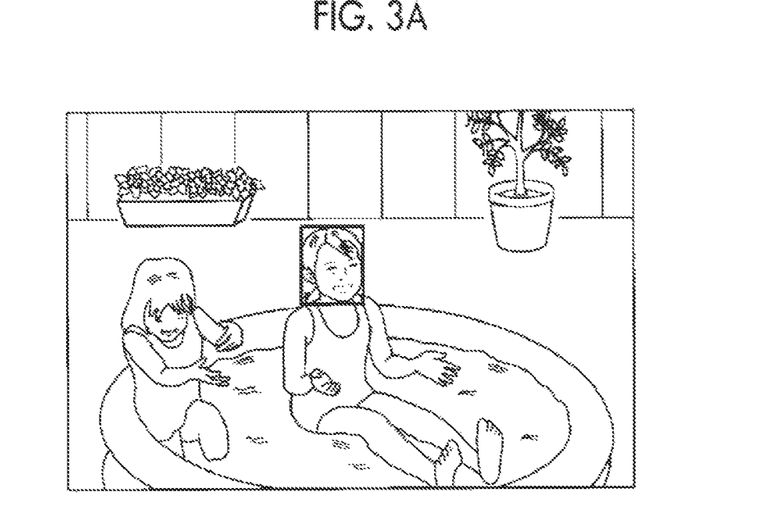
FIG. 3A is a conceptual diagram showing an example of an original image before processing of a user-processed image.
Figure 4A:
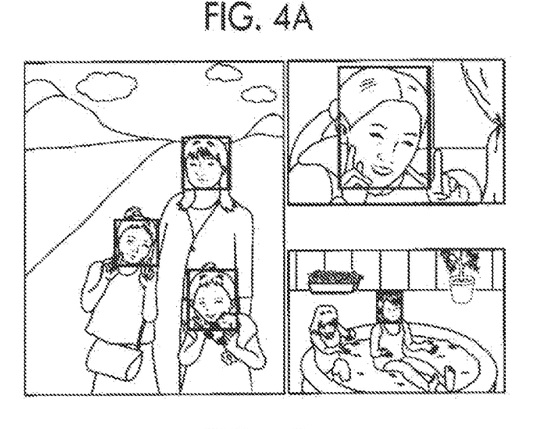
FIG. 4A is a conceptual diagram showing an example of a user-processed image created by compositing three original images.

For example, it is assumed that an image shown in FIG. 3A is an original image before processing of a user-processed image, and an image shown in FIG. 4A is a user-processed image (plural-image composite image) created by compositing three original images.

Figure 3B:
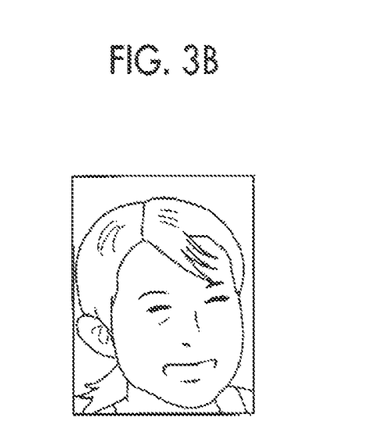
FIG. 3B is a conceptual diagram showing an example of an image of a face region of one character included in an original image.
Figure 4B:
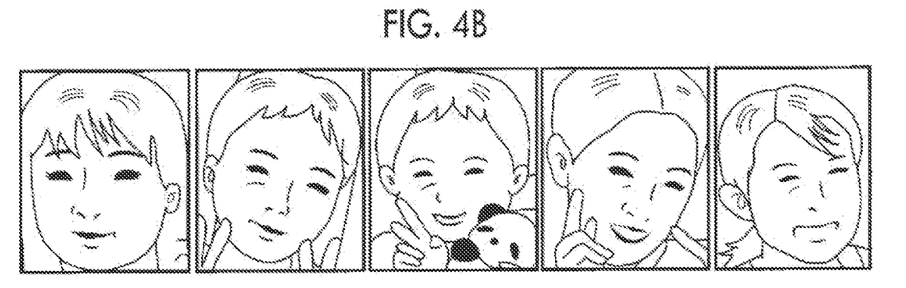
FIG. 4B is a conceptual diagram showing an example of images of face regions of five characters included in a user-processed image.

In this case, it is assumed that, as shown in FIG. 3B, a face region of one character included in the original image is detected by the face region detection unit 34, and similarly, as shown in FIG. 4B, face regions of five characters included in the three original images of the user-processed image are detected by the face region detection unit 34.

The original image determination unit 32 compares the image of the face region of one character included in the original images detected by the face region detection unit 34 with the images of the face regions of the five characters included in the user-processed image, thereby determining that the image shown in FIG. 3A is the original image before processing of the user-processed image shown in FIG. 4A based on high similarity between the image of the face region of one character included in the original images and the image of the thee region of a character on the rightmost side of FIG. 4B among the five characters included in the user-processed image.

A method in which the original image determination unit 32 determines the presence or absence of an original image before processing of the processed images among the candidate images is not limited to the example of (1) and (2) described above, and various methods including known methods may be used.

The priority determination unit 24 determines the priority of the candidate images.

The priority determination unit 24 determines the priority of the candidate images for use in creating the composite image, the composite image creation unit 22 creates the composite image using the original images and the processed images in a descending order of priority.

The priority determination unit 24 of this embodiment determines the priority of the processed images according to the presence or absence of supplementary information in the processed images, the presence or absence of a character of importance in the processed images, the degree of processing of the processed images, and a combination thereof.

A character of importance refers to a character who is included in more original images (unprocessed images) of the candidate images (a character who has a high appearance frequency in the original images). A character who is included in more original images is a character of importance having higher importance.

When determining the priority of the candidate images according to the presence or absence of supplementary information, if there is supplementary information, the processed images can he automatically classified based on information of imaging date and time included in the supplementary information in the order of imaging date and time, and thus the priority determination unit 24 gives priority to the processed images with supplementary information. That is, the priority determination unit 24 determines the priority of the processed images with supplementary information to be higher than the priority of the processed images with no supplementary information.

When determining the priority of the processed image according to the presence or absence of a character of importance, the priority determination unit 24 gives priority to the processed images including a character of importance based on the specification of a character by the face authentication unit 26. That is, the priority determination unit 24 determines the priority of the processed images including the same character included in a plurality of original images to be higher than the priority of the processed images (including the processed images including another character or including no character) not including the same character in a plurality of original images.

When determining the priority of the processed images according to the degree of processing, since the processed images having a lower degree of processing are suitable for creating the composite image, the priority determination unit 24 gives priority to the processed images having a low degree of processing based on the degree of processing of the processed images calculated by the processing degree calculation unit 28. That is, the priority determination unit 24 determines the priority of the processed images when the degree of processing is lower.

Table 1 shows an example of the prioritization of processed images by the prior determination unit 24 for the presence or absence of supplementary information, and a color-corrected image, a frame composite image, and a plural-image composite image as an image processing content.

TABLE 1

| Priority | Presence or absence of supplementary information | Color-corrected image | Frame composite image | Plural-image composition image | ... |
|---|---|---|---|---|---|
| 1 | ○ | ○ | | | |
| 2 | ○ | | ○ | | |
| 3 | | | | | |
| 4 | | ○ | | | |
| 5 | | | ○ | | |
| 6 | | | | ○ | |

In Table 1, priority is determined to be highest for 1 on the uppermost side and to be lowered downward in the order of 2, 3, 4, 5, and 6.

In the example of Table 1, a processed image having the highest first priority is a color-corrected image with supplementary information. It is considered that a color-corrected image is close to an original image and has a low degree of processing but depending on the degree of color correction. For this reason, the priority of the color-corrected image is higher than the priority of a frame composite image or a plural-image composite image.

Among color-corrected images, priority can be determined according to the degree of color correction. For example, the priority of a processed image with slightly corrected saturation is determined to be higher than the priority of a processed image with significantly corrected saturation, like color correction to "sepia" or "monochrome".

A processed image having a second priority is a frame composite image with supplementary information. A frame composite image is created by only compositing the decoration of a frame and has an image of a region other than the frame which is the same as an original image, and it is considered that the degree of processing is smallest next to a color-corrected image. For this reason, the priority of the frame composite image is lower than the priority of a color-corrected image, and is higher than the priority of a plural-image composite image whose degree of processing is considered to be highest.

A processed image having a third priority is created without subjecting direct processing to an image and does not have supplementary information. While a processed image with no supplementary information is given priority lower than a processed image with supplementary information, the processed image having the third priority is created without subjecting direction processing to an image. For this reason, the priority of the processed image having the third priority is higher than the priority of a color-corrected image, a frame composite image, or a plural-image composite image which does not have supplementary information and is created by subjecting direct processing to an image.

Processed images having a fourth priority and a fifth priority do not have supplementary information with respect to the processed images having the first priority and the second priority.

In the example of Table 1, a processed image having the lowest sixth priority is a plural-image composite image with no supplementary information. It is considered that supplementary information does not remain in a plural-image composite image. For this reason, the priority of the plural-image composite image is lower than the priority of a processed image with supplementary information.

The prioritization of Table 1 is an example, and for example, the priority of the processed images can be determined according to the presence or absence of a character of importance, a combination of the presence or absence of supplementary information, the presence or absence of a character of importance, and the degree of processing of the processed images, or the like.

Next, a use method when processed images are used in creating a composite image will be described.

When processed images are images with no supplementary information, imaging date and time information included in supplementary information cannot be used. For this reason, when the composite image is a photo book, the composite image creation unit 22 can collect and arrange candidate images with no supplementary information on the same page of the photo book.

For example, candidate images with supplementary information are arranged in a time-series order from the front page of the photo book, and processed images with no supplementary information are arranged in a file time stamp order of the processed images from a page after the candidate images with supplementary information are arranged.

Subsequent, when the processed images are frame composite images, the composite image creation unit 22 can create a composite image using reprocessed images of a region other than a frame extracted from the frame composite images by the reprocessing unit 30.

In this way, the reprocessed images of a region other than a frame are extracted from the frame composite images, whereby the composite image can be created using the reprocessed images in the same manner as the original images.

Subsequently, when the processed images are plural-image composite images, the composite image creation unit 22 can create a composite image using reprocessed images of original images extracted from the plural-image composite images by the reprocessing unit 30.

When the processed images are frame composite images or plural-image composite images, the composite image creation unit 22 can create a composite image using reprocessed images of a region including a face of a character extracted from the frame composite images or the plural-image composite images by the reprocessing unit 30 based on a face region of a character included in the candidate images detected by the face region detection unit 34.

When the composite image is a photo book, the composite image creation unit 22 can arrange one processed image on a page of the photo book, on which only one image is arranged, as it is.

In this way, one processed image is arranged on a page, on which only one image is arranged, as it is, and a processed image is not arranged in a mixed state with other images. For this reason, the processed image can be used without giving a sense of discomfort and damaging design of the photo book.

The composite image creation unit 22 can reduce the processed image to a size smaller than the original images and can create a composite image using the reduced images.

In this way, the processed image is reduced in size and the composite image is created using the reduced images, whereby the processed image can be used as inconspicuous as possible. For this reason, the processed image can be used without giving a sense of discomfort and damaging design of the composite image.

The composite image creation unit 22 may not use processed images in creating a composite image.

For example, when there is no page of the photo book on which only one image is arranged, and there is only one processed image, the composite image creation unit 22 does not use the processed images in creating a composite image.

Since a reprocessed image has a lower degree of processing than a processed image, the priority determination unit 24 can determine the priority of the reprocessed image to be higher than the priority of the processed image. In this case, the composite image creation unit 22 creates a composite image using the reprocessed image with priority over the processed image.

Table 2 shows another example of the prioritization of processed images by the priority determination unit 24 for the presence or absence of supplementary information, and a color-corrected image, a frame composite image, and a plural-image composite image as an image processing content.

TABLE 2

| Priority | Presence or absence of supplementary information | Color-corrected image | Frame composite image | Plural-image composition image | ... |
|---|---|---|---|---|---|
| 1 | ○ | ○ | | | |
| 2 | ○ | | ○ | | |
| 3 | | | | | |
| 4 | | | ○ | | |
| 5 | | | | ○ | |
| 6 | | ○ | | | |

When processed images are frame composite images or plural-image composite images, and when the reprocessed images extracted from the processed images by the reprocessing unit 30 are used in creating a composite image, the priority determination unit 24 can determine the priority of the reprocessed images of the frame composite images and the plural-image composite images without subjecting direct processing to an image to he higher than the priority of the processed images of the color-corrected images with processed saturation.

Table 2 is changed such that the processed image having the fourth priority in Table 1, that is, the processed image of the color--corrected image with no supplementary information has the lowest sixth priority, the processed images having the fifth priority and the sixth priority in Table 1, that is, the reprocessed images of the frame composite image with no supplementary information and the plural-image composite image with no supplementary information respectively have a fourth priority and a fifth priority.

In this way, the priority determination unit 24 can change the priority of the processed images according to the presence or absence of the reprocessed images.

The priority determination unit 24 can determine the priority of the original images before processing of the processed images based on the presence or absence of the processed images and characters included in the processed images.

For example, the priority determination unit 24 can give priority to an original image included in the user-processed image based on the determination result of the presence or absence of an original image before processing of the user-processed image by the original image determination unit 32. That is, the priority determination unit 24 determines the priority of an original image included in the user-processed image to be higher than the priority of an original image not included in the user-processed image.

When an original image before processing of the user-processed image is found among the candidate images, it is determined that the original image is an image for which the user has a special feeling, and the priority determination unit 24 determines the priority of the original image included in the processed image to be higher.

When the same original image is used in a plurality of user-processed images, the priority determination unit 24 determines the priority of the original image included in a plurality of user-processed images to be higher. That is, the priority determination unit 24 determines the priority of the original image included in a plurality of processed images to be higher than the priority of an original image not included in a plurality of processed images.

When the composite image is a photo book, as a method of using original images for use in creating the photo book with priority, the following methods of (1) to (4) are used.

(1) An original image having a high priority is arranged on a large scale on a page.

(2) An original image having a high priority is arranged at the center of a page.

(3) Processing (decoration) according to the theme of the photo book is performed on an original image having a high priority.

(4) An original image having a high priority is arranged on a special page, such as a cover or a front cover.

The priority determination unit 24 can give priority to an original image including a character included in the user-processed image based on the specification of the character by the face authentication unit 26. That is, the priority determination unit 24 determines the priority of the original image including the character included in the user-processed image to be higher than the priority of an original image not including the character included in the user-processed image.

It is determined that a character (face) included in the user-processed image is a character of importance, and the priority determination unit 24 determines the priority of the original images including the character to be higher.

When the same character is included in a plurality of user-processed images, the priority determination unit 24 determines the priority of an original image included in a plurality of user-processed images to be higher. That is, the priority determination unit 24 determines the priority of the original image including the same character included in a plurality of user-processed images to be higher than the priority of an original image not including the same character included in a plurality of processed images.

When the composite image is a photo book, as a method of using original images for use in creating the photo book with priority, the following methods of (1) to (6) are used.

(1) The original images including the same character are arranged on a large scale on a page.

(2) The original images including the same character are arranged at the center of a page.

(3) Processing (decoration) according to the theme of the photo book is performed on the original images including the same character.

(4) The original images including the same character are arranged on a special page, such as a cover or a front cover.

(5) More original images including the same character are used in the photo book.

(6) The original images not including the same character are not used in the photo book.

Figure 2:
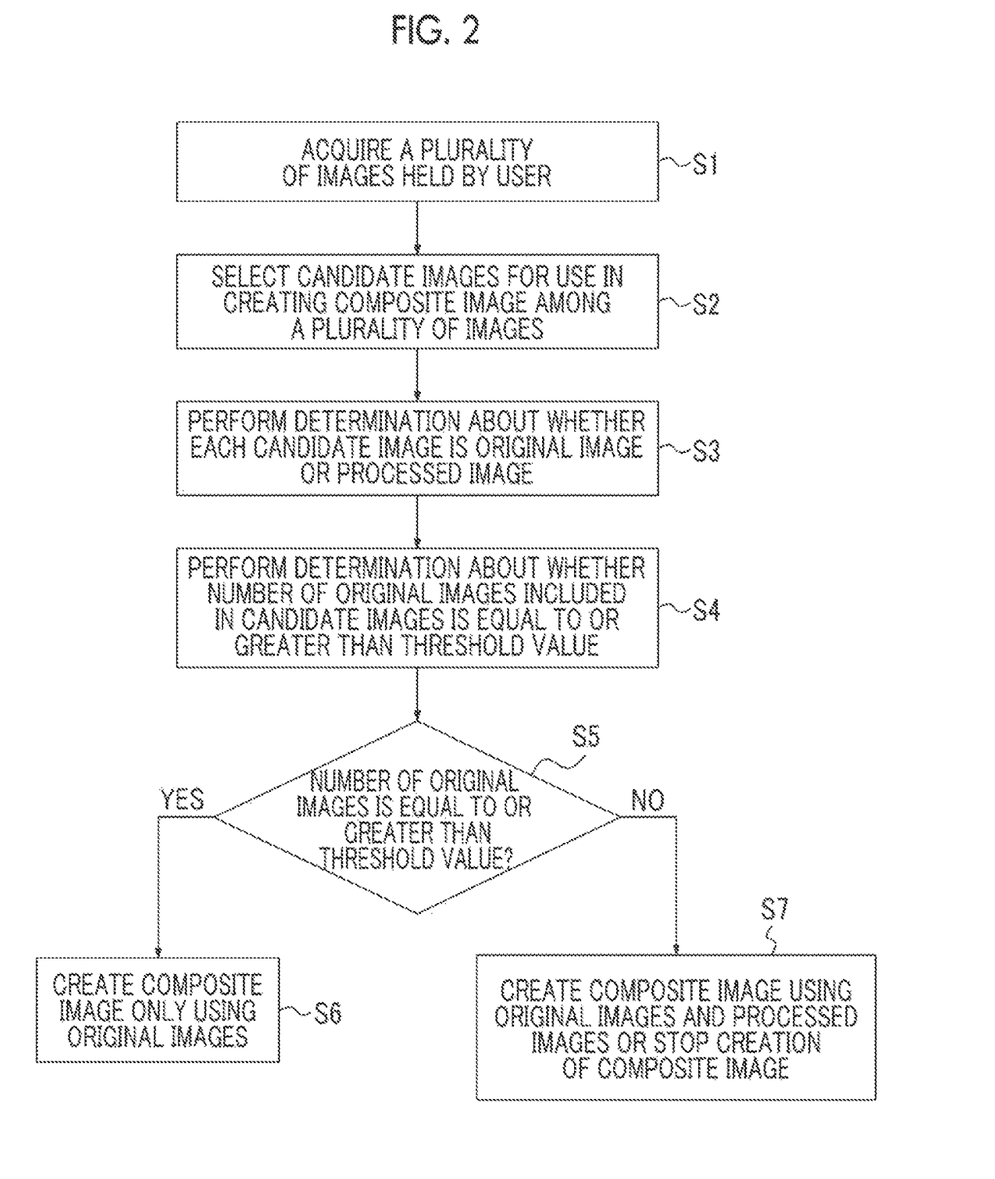
FIG. 2 is a flowchart showing an example of the operation of the image processing apparatus shown in FIG. 1.

Next, the schematic operation of the image processing apparatus 10 will be described referring to the flowchart shown in FIG. 2.

In the image processing apparatus 10, first, a plurality of images held by the user are acquired by the image acquisition unit 12 (Step S1).

Subsequently, candidate images for use in creating a composite image are selected from among a plurality of images by the candidate image selection unit 16 (Step S2).

Subsequently, determination about whether the candidate images are original images or processed images is performed by the processed image determination unit 18 (Step S3).

Subsequently, determination about whether or not the number of original images included in the candidate images is equal to or greater than a threshold value set in advance is performed by the image count determination unit 20 based on the determination result by the processed image determination unit 18 (Step S4).

When it is determined that the number of original images is equal to or greater than the threshold value ("YES" in Step S5), the composite image is created using only the original images by the composite image creation unit 22 (Step S6). When it is determined that the number of original images is less than the threshold value ("NO" in Step S5), the composite image is created using the original images and the processed images by the composite image creation unit 22 or the creation of the composite image is stopped (Step S7).

In the image processing apparatus 10, determination is performed about whether or not the number of original images included in the candidate images is equal to or greater than the threshold value set in advance, when the number of original images is equal to or greater than the threshold value, only the original images are determined as images for use in creating a composite image, and only when the number of original images is less than the threshold value, both the original images and the processed images are determined as images for use in creating the composite image.

With this in the image processing apparatus 10, it is possible to determine images for use in creating a composite image without using processed images unsuitable for creating the composite image, and to create the composite image using the determined images.

As described above, the priority of the candidate images is determined, whereby it is possible to create a composite image using candidate images suitable for creating the composite image in a descending order of priority.

The specific configuration of each constituent element of the image processing apparatus 10 is not limited, and various configurations having the same function as described above may be used.

The method of the invention may be realized by, for example, a program which causes a computer to execute the respective steps. The program may be provided in the form of Software as a Service (Saas) through Internet. A computer readable recording medium storing the program may be provided.

The invention is basically as described above.

Although the invention has been described in detail, the invention is not limited to the above-described embodiment and may be of course improved or changed in various ways within the scope without departing from the spirit of the invention.

What is claimed is:

1. An image processing apparatus comprising:
one or more processors configured to
acquire candidate images for use in creating a composite image,
determine whether the candidate images are unprocessed original images or processed images created by processing the original images,
determine whether or not the number of original images included in the candidate images is equal to or greater than a threshold value set in advance based on the processed image determination result, and
determine when it is determined that the number of original images is equal to or greater than the threshold value, only the original images as images for use in creating the composite image and determine when it is determined that the number of original images is less than the threshold value, the original images and the processed images as images for use in creating the composite image or stops the creation of the composite image.

2. The image processing apparatus according to claim 1, further comprising:
an image acquisition device which acquires a plurality of images held by a user,
wherein the one or more processors select the candidate images from among the plurality of images, and acquire the selected candidate images.

3. The image processing apparatus according to claim 1, further comprising:
a display configured to display the determined images.

4. The image processing apparatus according to claim 1,
wherein the one or more processors create the composite image using the determined images.

5. The image processing apparatus according to claim 1,
wherein the one or more processors determine the priority of the candidate images, and create the composite image using the original images and the processed images in a descending order of priority.

6. The image processing apparatus according to claim 5,
wherein the one or more processors determine the priority of a processed image with supplementary information to be higher than the priority of a processed image with no supplementary information.

7. The image processing apparatus according to claim 5,
wherein the one or more processors perform face authentication of a character included in each of the candidate images to specify the character, and
determine the priority of a processed image including the same character included in a plurality of original images to be higher than the priority of a processed image not including the same character included in the plurality of original images based on the specification of the character.

8. The image processing apparatus according to claim 5,
wherein the one or more processors perform face authentication of a character included in each of the candidate images to specify the character, and
determine the priority of an original image including a character included in a processed image processed by the user to be higher than the priority of an original image not including a character included in a processed image processed by the user based on the specification of the character.

9. The image processing apparatus according to claim 8,
wherein the one or more processors determine the priority of an original image including the same character included in a plurality of processed images processed by the user to be higher than the priority of an original image not including the same character included in a plurality of processed images processed by the user.

10. The image processing apparatus according to claim 5,
wherein the one or more processors calculate the degree of processing of the processed images, and
determine the priority of the processed images to be higher as the degree of processing is lower.

11. The image processing apparatus according to claim 5,
wherein the one or more processors perform reprocessing on the processed images to create reprocessed images including only the regions of the original images, and
determine the priority of the reprocessed images to be higher than the priority of the processed images.

12. The image processing apparatus according to claim 11,
wherein the one or more processors detect a face region of a character included in each of the candidate images,
extract, as the reprocessed images, images of a region including a face of a character included in processed images, in which a frame is composited to the original images, or processed images, in which a plurality of original images are composited, based on the detection result of the face region by the face region detection unit, and
create the composite image using the reprocessed images of a region including a face of a character extracted from the processed images.

13. The image processing apparatus according to claim 11,
wherein the one or more processors extract, as the reprocessed images, images of a region other than a frame from processed images, in which the frame is composited to the original images, and
create the composite image using the reprocessed images of a region other than a frame extracted from the processed images.

14. The image processing apparatus according to claim 11,
wherein the one or more processors extract, as the reprocessed images, original images from processed images, in which a plurality of original images are composited, and
create the composite image using the reprocessed images of original images extracted from the processed images.

15. The image processing apparatus according to claim 5,
wherein the one or more processors determine whether the processed images processed by the user among the candidate images are original images before the processing, and
determine the priority of an original image included in a processed image processed by the user to be higher than the priority of an original image not included in a processed image processed by the user based on the original image determination result.

16. The image processing apparatus according to claim 5,
wherein the one or more processors determine the priority of an original image included in a plurality of processed images to be higher than the priority of an original image not included in the plurality of processed images.

17. The image processing apparatus according to claim 1,
wherein the one or more processors confirm the presence or absence of supplementary information of the candidate images and determine that the candidate images with no supplementary information are the processed images.

18. The image processing apparatus according to claim 1, wherein the one or more processors detect an image boundary in the candidate images and determine that candidate images with an image boundary along a peripheral portion are processed images in which a frame is composited to the original images.

19. The image processing apparatus according to claim 1, wherein the one or more processors detect an image boundary in the candidate images and determine that candidate images with at least one of an image boundary from a peripheral portion toward a central portion and two or more faces of the same character are processing images in which a plurality of original images are composited.

20. The image processing apparatus according to claim 1, wherein the one or more processors detect the value of saturation in the candidate images and determine that candidate images in which the value of saturation is biased compared to an un-color-corrected standard image are processed images created by subjecting color correction to the original images.

21. The image processing apparatus according to claim 1, wherein the one or more processors reduce the processed images to a size smaller than the original images and create the composite image using the reduced images.

22. The image processing apparatus according to claim 1, wherein the composite image is a photo book, and the one or more processors collect and arrange candidate images with no supplementary information on the same page of the photo book.

23. The image processing apparatus according to claim 1, wherein the composite image is a photo book, and the one or more processors arrange one processed image on a page of the photo book on which only one image is arranged.

24. The image processing apparatus according to claim 1, further comprising:
a warning generation device which gives, to the user, a warning indicating that the composite image is created using the processed image when the composite image is created using the processed images.

25. The image processing apparatus according to claim 24, wherein the warning generation device gives, to the user, a warning for confirming whether or not to create the composite image using the processed images before the composite image is created using the processed images.

26. The image processing apparatus according to claim 24, wherein the warning generation device gives, to the user, a warning indicating that the composite image is created using the processed images after the composite image is created using the processed images.

27. An image processing method using a computer, the image processing method comprising:
acquiring candidate images for use in creating a composite image;
determining whether the candidate images are unprocessed original images or processed images created by processing the original images;
determining whether or not the number of original images included in the candidate images is equal to or greater than a threshold value set in advance based on the processed image determination result; and
determining when it is determined that the number of original images is equal to or greater than the threshold value, only the original images as images for use in creating the composite image and determining when it is determined that the number of original images is less than the threshold value, the original images and the processed images as images for use in creating the composite image or stops the creation of the composite image.

28. The image processing method according to claim 27, further comprising:
acquiring a plurality of images held by a user; and
selecting the candidate images among the plurality of images,
wherein the selected candidate images are acquired.

29. The image processing method according to claim 27, further comprising:
displaying, by a display device, the determined images.

30. The image processing method according to claim 27, further comprising:
creating the composite image using the determined images.

31. A non-transitory computer readable recording medium storing an image processing program, the image processing program causing a computer to execute:
acquiring candidate images for use in creating a composite image;
determining whether the candidate images are unprocessed original images or processed images created by processing the original images;
determining whether or not the number of original images included in the candidate images is equal to or greater than a threshold value set in advance based on the processed image determination result; and
determining when it is determined that the number of original images is equal to or greater than the threshold value, only the original images as images for use in creating the composite image and determining when it is determined that the number of original images is less than the threshold value, the original images and the processed images as images for use in creating the composite image or stops the creation of the composite image.

* * * * *